US010178924B2

(12) United States Patent
French et al.

(10) Patent No.: US 10,178,924 B2
(45) Date of Patent: Jan. 15, 2019

(54) COOKING SYSTEM

(71) Applicant: SharkNinja Operating LLC, Needham, MA (US)

(72) Inventors: Jon French, Uxbridge, MA (US); Aric Jennings, Boston, MA (US); Jamie Paul Gagnon, Webster, MA (US); Brian McGee, Acton, MA (US); David M. Audette, Webster, MA (US); Michael Joseph Smith, Salem, MA (US); John Cheung, Tseung Kwan O (HK); Joyce Chien Tu, Brighton, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 285 days.

(21) Appl. No.: 14/382,309

(22) PCT Filed: Feb. 27, 2013

(86) PCT No.: PCT/US2013/027960
§ 371 (c)(1),
(2) Date: Aug. 29, 2014

(87) PCT Pub. No.: WO2013/130559
PCT Pub. Date: Sep. 6, 2013

(65) Prior Publication Data
US 2015/0020693 A1 Jan. 22, 2015

Related U.S. Application Data

(60) Provisional application No. 61/604,565, filed on Feb. 29, 2012.

(51) Int. Cl.
*A47J 27/00* (2006.01)
*A47J 27/12* (2006.01)
(Continued)

(52) U.S. Cl.
CPC ............. *A47J 27/004* (2013.01); *A47J 27/12* (2013.01); *A47J 27/13* (2013.01); *A47J 27/62* (2013.01); *H05B 1/0261* (2013.01)

(58) Field of Classification Search
CPC . A47J 27/12; A47J 27/13; A47J 27/62; H05B 1/0261
(Continued)

(56) References Cited

U.S. PATENT DOCUMENTS 2,138,706 A    11/1938  Myers
5,515,733 A     5/1996  Lynnworth
(Continued)

OTHER PUBLICATIONS

Chinese Patent Application No. 201390000438.9 filed Feb. 27, 2013.
(Continued)

*Primary Examiner* — Dana Ross
*Assistant Examiner* — Kuangyue Chen
(74) *Attorney, Agent, or Firm* — Cantor Colburn LLP

(57) ABSTRACT

A cooking system includes a housing and a liner with a bottom heating element and a side circumferential heating element in a plurality of segments electrically connected. A control subsystem includes a selector for the user switchable between slow cook and stove top modes. Both the bottom heating element and the side circumferential heating element are energized and in the stove top mode. Only the side circumferential heating element is energized in the slow cook mode.

21 Claims, 9 Drawing Sheets

(51) Int. Cl.
*A47J 27/13* (2006.01)
*A47J 27/62* (2006.01)
*H05B 1/02* (2006.01)

(58) Field of Classification Search
USPC .............. 99/325–329 R, 331–333, 340, 359; 219/429, 432–433, 441
See application file for complete search history.

(56) References Cited

U.S. PATENT DOCUMENTS

| | | | |
|---|---|---|---|
| 6,188,046 B1 | 2/2001 | Barrow | |
| 6,515,262 B1 | 2/2003 | Li | |
| 6,624,392 B2 | 9/2003 | Li | |
| 6,740,855 B1 | 5/2004 | Decobert | |
| 6,872,921 B1* | 3/2005 | DeCobert | A47J 27/004 219/432 |
| 7,943,888 B2 | 5/2011 | Barnes | |
| 2004/0159649 A1 | 8/2004 | Li | |
| 2010/0193523 A1* | 8/2010 | Beisheim | A47J 47/16 220/379 |
| 2012/0048843 A1* | 3/2012 | Feng | A47J 27/004 219/442 |
| 2015/0257574 A1* | 9/2015 | Hoare | A47J 27/10 99/342 |

OTHER PUBLICATIONS

Chinese Office Action dated Feb. 27, 2015 for Chinese Patent Application No. 201390000438.9.
International Search Report; International Application No. PCT/US2013/027960; International Filing Date: Feb. 27, 2013; dated Jun. 21, 2013; 3 Pages.
Written Opinion of the International Searching Authority; International Application No. PCT/US2013/027960; International Filing Date: Feb. 27, 2013; dated Jun. 21, 2013; 6 Pages.

* cited by examiner

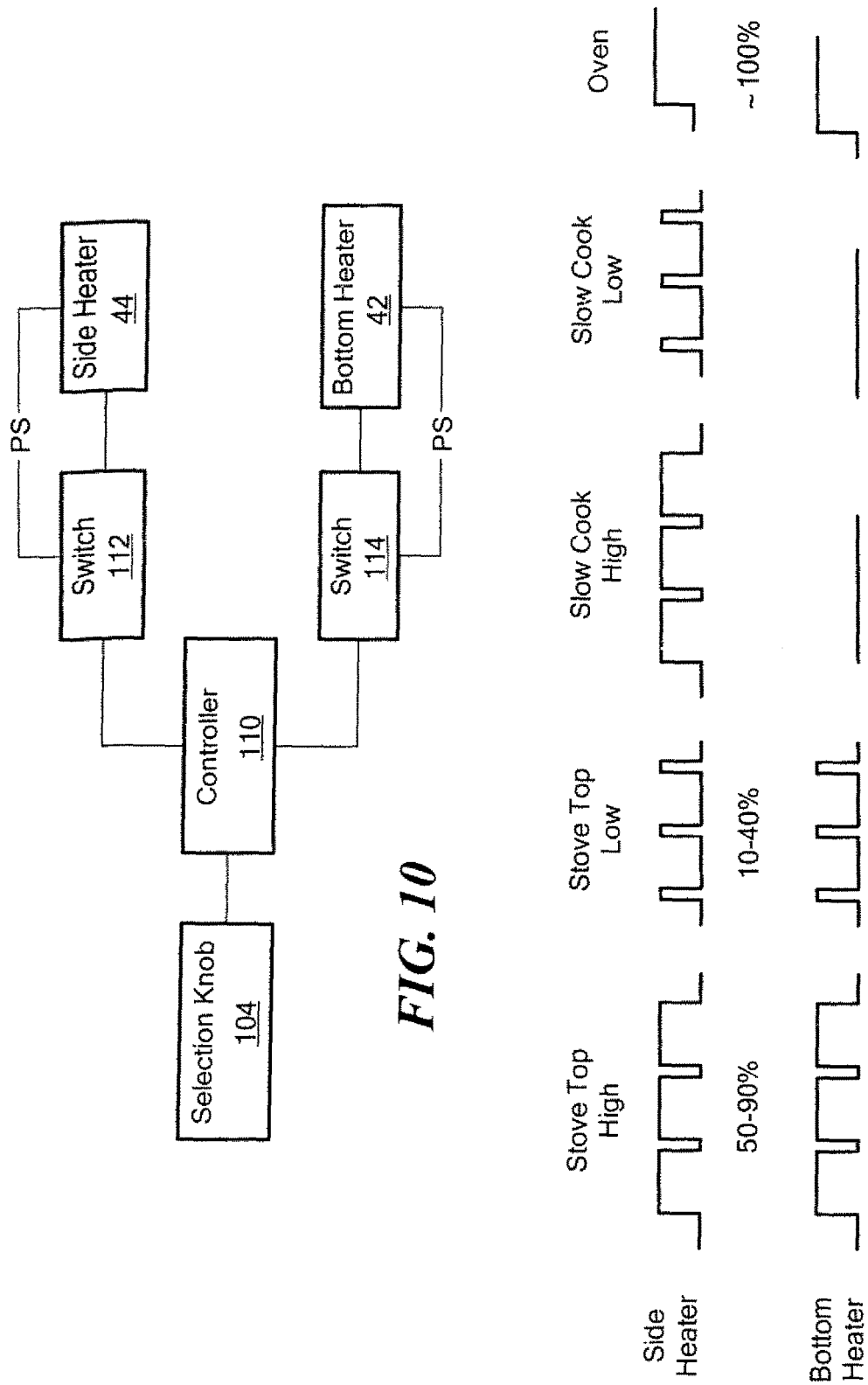

COOKING SYSTEM

RELATED APPLICATIONS

Pursuant to 35 U.S.C. § 371, this application is a national stage application of the PCT Int. App. No. PCT/US2013/027960 filed on Feb. 27, 2013, which claims benefit of and priority to U.S. Provisional Application Ser. No. 61/604,565 filed Feb. 29, 2012 under 35 U.S.C. §§ 119, 120, 363, 365, and 37 C.F.R. § 1.55 and § 1.78 and is incorporated herein by this reference.

FIELD OF THE INVENTION

The subject invention relates to crock pots and the like.

BACKGROUND OF THE INVENTION

Cooking devices such as crock pots and the like with side and bottom heating elements are known.

U.S. Pat. No. 2,138,706 discloses side and bottom heating elements connected in series and thus only controllable together. U.S. Pat. Nos. 6,515,262 and 6,624,392 have side and bottom heaters connected in parallel and thus a switch can be used to turn them both on, both off, or on individually. U.S. Pat. No. 5,515,733 discloses, as best can be ascertained, an input switch for switching between the side and bottom heating elements.

Switching between the heating elements and/or running them simultaneously can be confusing to the user. In some devices, the bottom heating element is slow to provide heat and/or does not provide sufficient heat for searing meat or the like.

SUMMARY OF THE INVENTION

Disclosed is a multi-functional cooking system that can deliver stovetop cooking, slow cooking and dual heat steam roasting and baking. For example, stovetop cooking functions can include simmering, sautéing and searing of meats and vegetables. Cook at low power to simmer, at medium power to sauté, and at high power to sear. For slow cooking, functions can include low power, high power and buffet mode. In some instances, slow cooking functions can include a programmable countdown timer with automatic keep-warm feature. Dual heat steam function of roasting and baking can be carried out at temperatures in the range of from about 250° F. to about 450° F., among other temperature ranges. The steam roasting and baking technique can deliver optimal flavor and healthier cooking. In some embodiments, the multi-functional cooking system can also include accessories including the likes of roasting rack, metal or glass lid, digital controls and non-stick cooking pot (e.g., 6 quarts), among others.

In one embodiment, a cooking system includes a housing, a container received within the housing, where the container is designed to receive food products therein. The cooking system also includes a heating element in communication with the container, where the heating element is capable of applying a predetermined power setting for cooking the food products in the container, the heating element capable of cooking the food products independent of the loading of the food products.

In some instances, the container can be a bowl or a pot. In one embodiment, the heating element can be disposed about the base of the housing. In another embodiment, the heating element can be disposed substantially circumferentially about the sidewall of the housing. In yet another embodiment, the heating element can be disposed about the base of the housing and substantially circumferentially about the sidewall of the housing.

In one embodiment, the predetermined power setting includes a first power setting and a second power setting, where the first power setting is higher than the second power setting. In another embodiment, the predetermined power setting includes a third power setting, where the second power setting is higher than the third power setting. In one embodiment, the predetermined power setting includes a first cycle state and a second cycle state, where the first cycle state is higher than the second cycle state. In another embodiment, the predetermined power setting includes a third cycle state, where the second cycle state is higher than the third cycle state.

In some embodiments, the multi-functional cooking system includes a lid for covering the container. In other embodiments, the multi-functional cooking system includes a fastener for securing the lid and the container to the housing. For example, the fastener can be a strap.

In one embodiment, a cooking system includes a housing and a container received within the housing, where the container is capable of receiving water and food products. A heating element can be in communication with the container, where the heating element is capable of applying a power setting for cooking the food products in the container without the container having to achieve a predetermined temperature. In another embodiment, the heating element is capable of converting water to steam to facilitate the cooking of the food products in the container.

In some embodiments, the steam facilitates in reducing the amount of fat associated with the food products by at least about 5%, or at least about 10%, or at least about 15%, or at least about 20%, or at least about 25%, or at least about 30%, or at least about 35%, or at least about 40%, or at least about 45%, or at least about 50%. In other embodiments, the steam facilitates in reducing the cooking time of the food products by at least about 5%, or at least about 10%, or at least about 15%, or at least about 20%, or at least about 25%, or at least about 30%, or at least about 35%, or at least about 40%, or at least about 45%, or at least about 50%.

In some instances, the container can be a bowl or a pot. In one embodiment, the heating element can be disposed about the base of the housing. In another embodiment, the heating element can be disposed substantially circumferentially about the dewall of the housing. In yet another embodiment, the heating element can be disposed about the base of the housing and substantially circumferentially about the sidewall of the housing. In some embodiments, the cooking system includes a lid for covering the container. In other embodiments, the cooking system includes a fastener for securing the lid and the container to the housing. For example, the fastener can be a strap.

In one embodiment, a method of cooking food products includes adding food products to a container received within a housing, concomitantly adding water to the container, and applying a cooking process to the food products within the container without waiting for the container to achieve a predetermined temperature, where water can be converted to steam by the cooking process facilitates in the cooking of the food products within the container.

In some embodiments, the steam facilitates in reducing the amount of fat associated with the food products by at least about 5%, or at least about 10%, or at least about 15%, or at least about 20%, or at least about 25%, or at least about 30%, or at least about 35%, or at least about 40%, or at least about 45%, or at least about 50%. In other embodiments, the steam facilitates in reducing the cooking time of the food products by at least about 5%, or at least about 10%, or at least about 15%, or at least about 20%, or at least about 25%, or at least about 30%, or at least about 35%, or at least about 40%, or at least about 45%, or at least about 50%.

In one embodiment, a cooking system includes a housing, a container received within the housing, where the container is configured to receive food products, and a heating element in communication with the container, where the heating element is operable to apply at least one of predetermined power setting and continuous power setting for cooking the food products in the container, where the predetermined power setting and the continuous power setting are configured on a single controller.

In one embodiment, the predetermined power setting includes a first power setting and a second power setting, where the first power setting is higher than the second power setting. In another embodiment, the predetermined power setting includes a third power setting, where the second power setting is higher than the third power setting. In one embodiment, the predetermined power setting includes a first cycle state and a second cycle state, where the first cycle state is higher than the second cycle state. In another embodiment, the predetermined power setting includes a third cycle state, where the second cycle state is higher than the third cycle state.

In one embodiment, the continuous power setting includes incremental power being supplied to the container. In another embodiment, the continuous power setting includes gradient heat being provided from the heating element to the container.

Featured is a cooking system comprising a housing and a liner in the housing including a bottom heating element and a side circumferential heating element in a plurality of segments electrically connected. A control subsystem includes a selector switchable between slow cook and stove top modes. Both the bottom heating element and the side circumferential heating element are energized and in the stove top mode. The side circumferential heating element is energized and the bottom heating element is de-energized in the slow cook mode.

In one example, the control subsystem further includes a first switch for energizing the bottom heating element, a second switch for energizing the side heating element, and a controller configured to control the first and second switches. The controller may be configured, in response to a stove top high mode, to switch the first switch on and off according to a first duty cycle and to switch the second switch on and off according to a second duty cycle. First and second duty cycles may be equal or approximately equal. The controller may be configured, in response to a stove top low mode, to switch the first switch on and off according to a third duty cycle and, in the stove top low mode, to switch the second switch on and off according to a fourth duty cycle. The third and fourth duty cycles may be equal or approximately equal. The controller may be configured, in response to a slow cook high mode, to switch the second switch on and off according to the first duty cycle and, in response to the slow cook low mode, to switch the second switch on and off according the fourth duty cycle.

Preferably, the controller is configured to switch the first switch and/or the second switch according to a plurality of additional duty cycles in the stove top and/or slow cook modes.

Also featured is a cooking system comprising a first switch for energizing a bottom heating element, a second switch for energizing a side heating element, and a controller responsive to a selector and configured to control the first and second switches according to a plurality of duty cycles. The selector is preferably switchable between slow cook and stove top modes and the controller is preferably configured to energize the side circumferential heating element and the bottom heating element in the stove top mode.

Also featured is a cooking system control method comprising energizing both a bottom heating element and a side heating element in a stove top mode and energizing only the side heating element in a slow cook mode. In a first stove top selection, the bottom and side heating elements are switched on and off according to one or more higher duty cycles and, in a second stove top selection, the bottom and side heating elements are switched on and off according to one more lower duty cycles. In a first slow cook selection, the side heating element can be switched on and off according to a higher duty cycle and, in a second slow cook selection, the side heating element can be switched on and off according to a lower duty cycle.

Other variations, embodiments and features of the present disclosure may become more evident from the following detailed description and drawings.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 10 is a block diagram showing several of the primary components associated with the cooking system of FIG. 9.

FIG. 11 is a timing diagram showing the algorithm loaded into or run by the controller shown in FIG. 10.

DETAILED DESCRIPTION OF THE INVENTION

Figure 1:
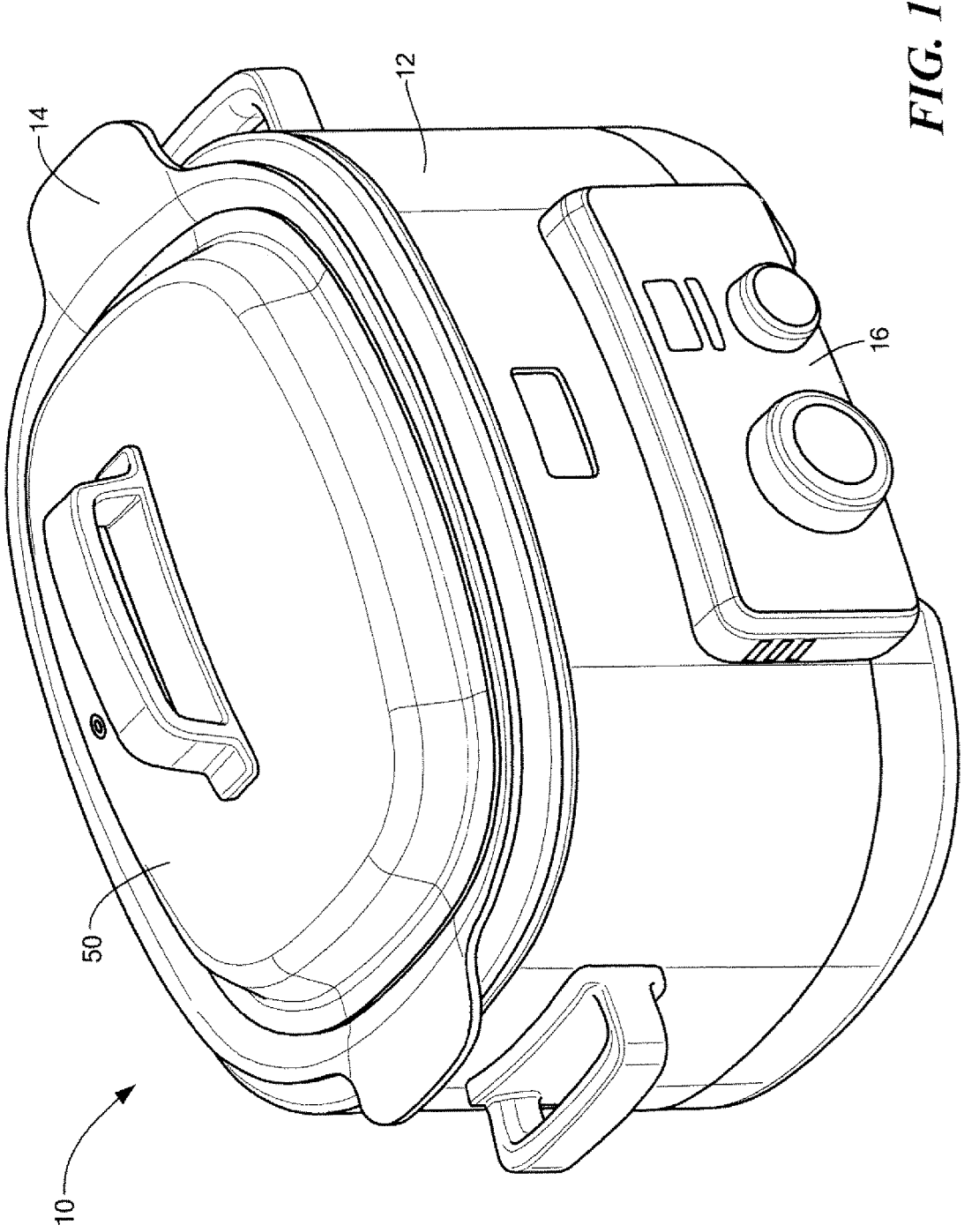
FIG. 1 is a perspective view of a cooking system according to one embodiment of the present disclosure.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

It will be appreciated by those of ordinary skill in the art that the disclosure can be embodied in other specific forms without departing from the spirit or essential character thereof. The presently disclosed embodiments are therefore considered in all respects to be illustrative and not restrictive.

FIG. 1 is a perspective view of a cooking system 10 according to one embodiment of the present disclosure. In one embodiment, the cooking system 10 includes a housing 12 and a container 14 received within the housing 12. The container 14 is designed to receive food products therein. The food products can include the likes of bread, rice, pasta, vegetables, fruits, dairy products, meats, fish and poultry, among others. In some instances, the cooking system 10 can also include a panel 16 on a side of the housing 12, the panel 16 capable of housing controls for operation of the cooking system 10.

In one embodiment, the cooking system 10 includes a heating element 42, 44 (best shown in FIG. 4) in communication with the container 14, where the heating element 42, 44 is capable of applying a predetermined power setting for cooking the food products in the container 14. In operation, the heating element 42, 44 is capable of cooking the food products independent of the loading of the food products. In other words, the heating element 42, 44 is capable of cooking the food products independent of the amount of food products within the container 14. This will be disclosed in more detail in subsequent figures and discussion.

In some embodiments, the cooking system 10 includes a lid 50 for covering the container 14. For example, the lid 50 can be made of glass or aluminum or stainless steel. In other embodiments, the lid 50 can be made of other suitable materials. In one embodiment, the cooking system 10 includes a fastener 60 for securing the lid 50 and the container 14 to the housing 12. For example, the fastener 60 can be a strap. In some embodiments, the fastener 60 can be made of cloth, plastic or an elastomeric material. In other embodiments, the fastener 60 can be made of other suitable material capable of capable of stretching and withstanding the heat from the cooking system 10.

Figure 2:
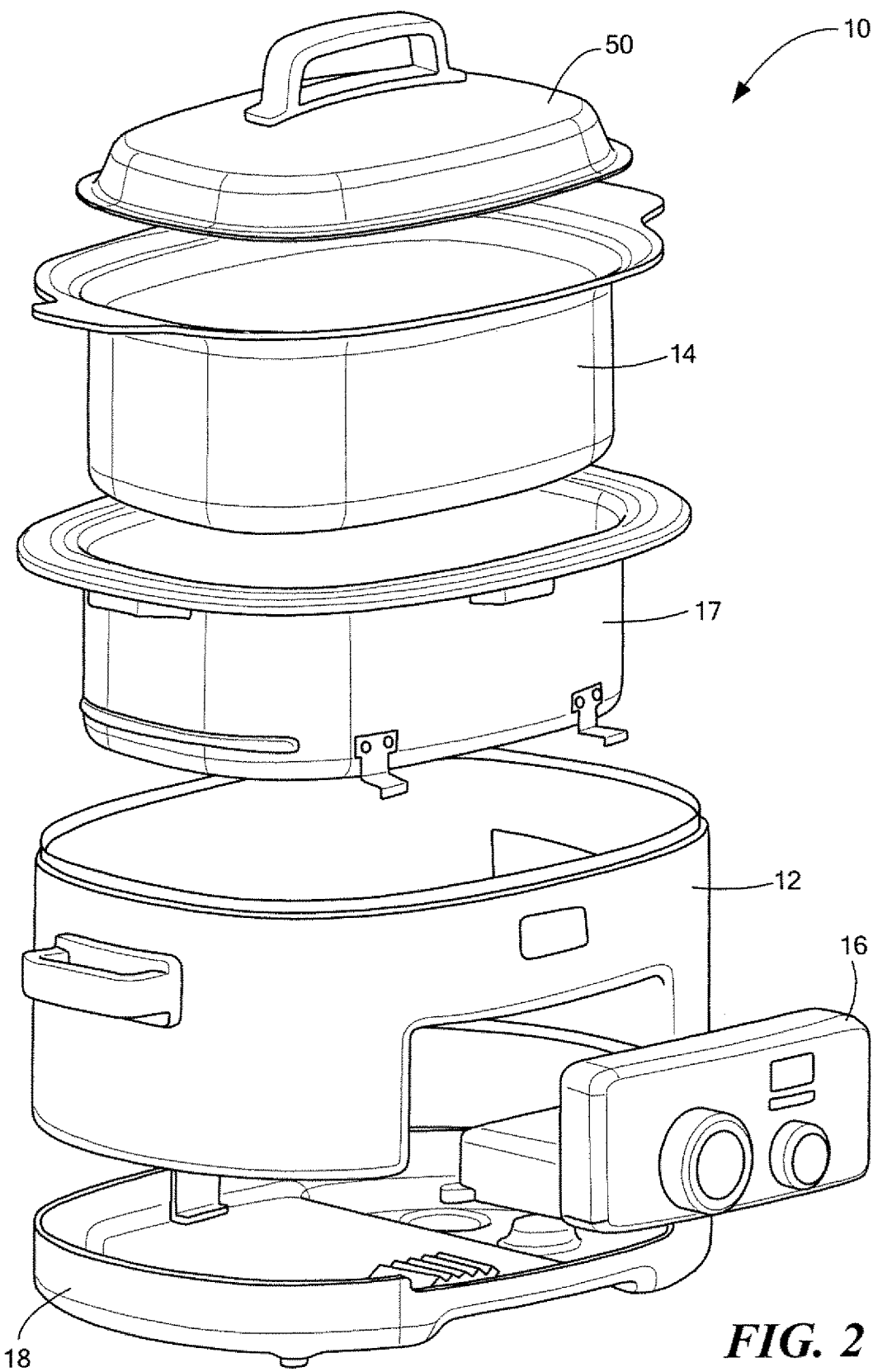
FIG. 2 is an exploded view of the cooking system.

FIG. 2 is an exploded view of the cooking system 10. As shown, the cooking system 10 includes a container 14 capable of being received by the wrap or housing 12. In some instances, in between the container 14 and the housing 12 is a liner 17, the liner 17 capable of receiving the container 14 and being received by the housing 12. In one embodiment, the cooking system 10 also includes a base 18 on which the housing 12 and the panel 16 can be mounted to.

Figure 3:
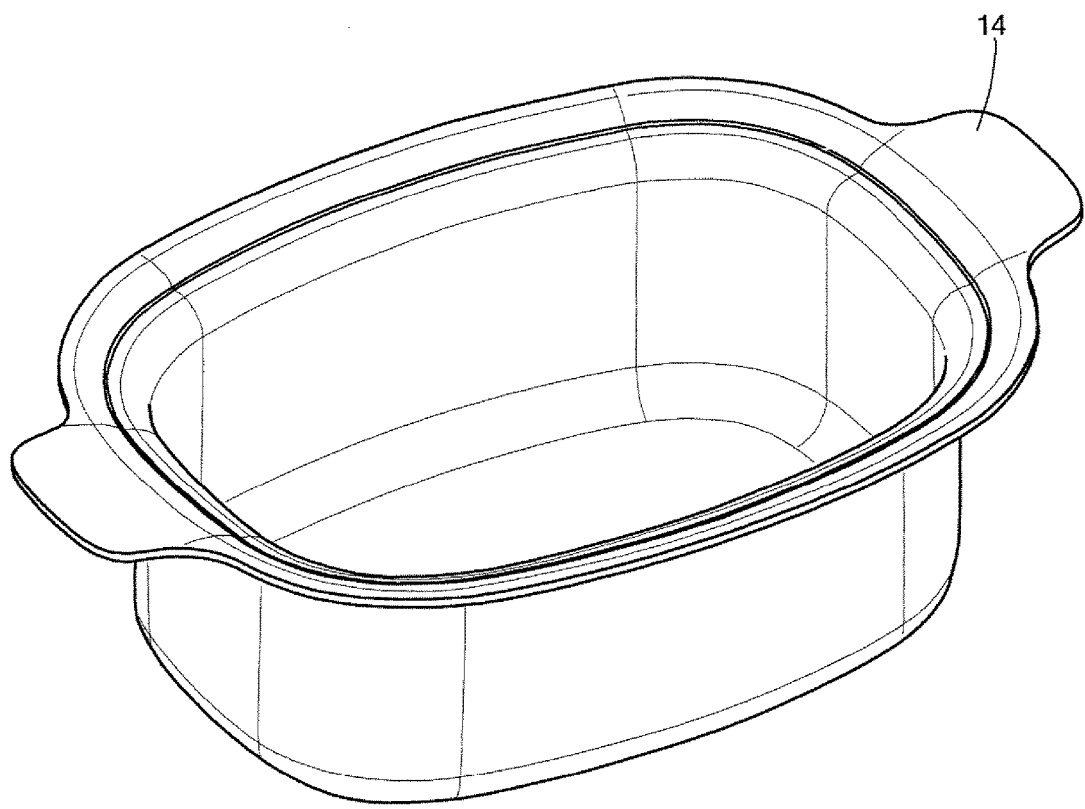
FIG. 3 is a perspective view of a container of the cooking system.

FIG. 3 is a perspective view of a container 14 of the cooking system 10. In some embodiments, the container 14 can be a bowl or a pot. For example, the container 14 can be made of ceramic or metal. In the alternative, the container 14 can also be made of die cast aluminum. In other embodiments, the container 14 can be made of other suitable material capable of withstanding the high temperature required for cooking food products therein.

Figure 4:
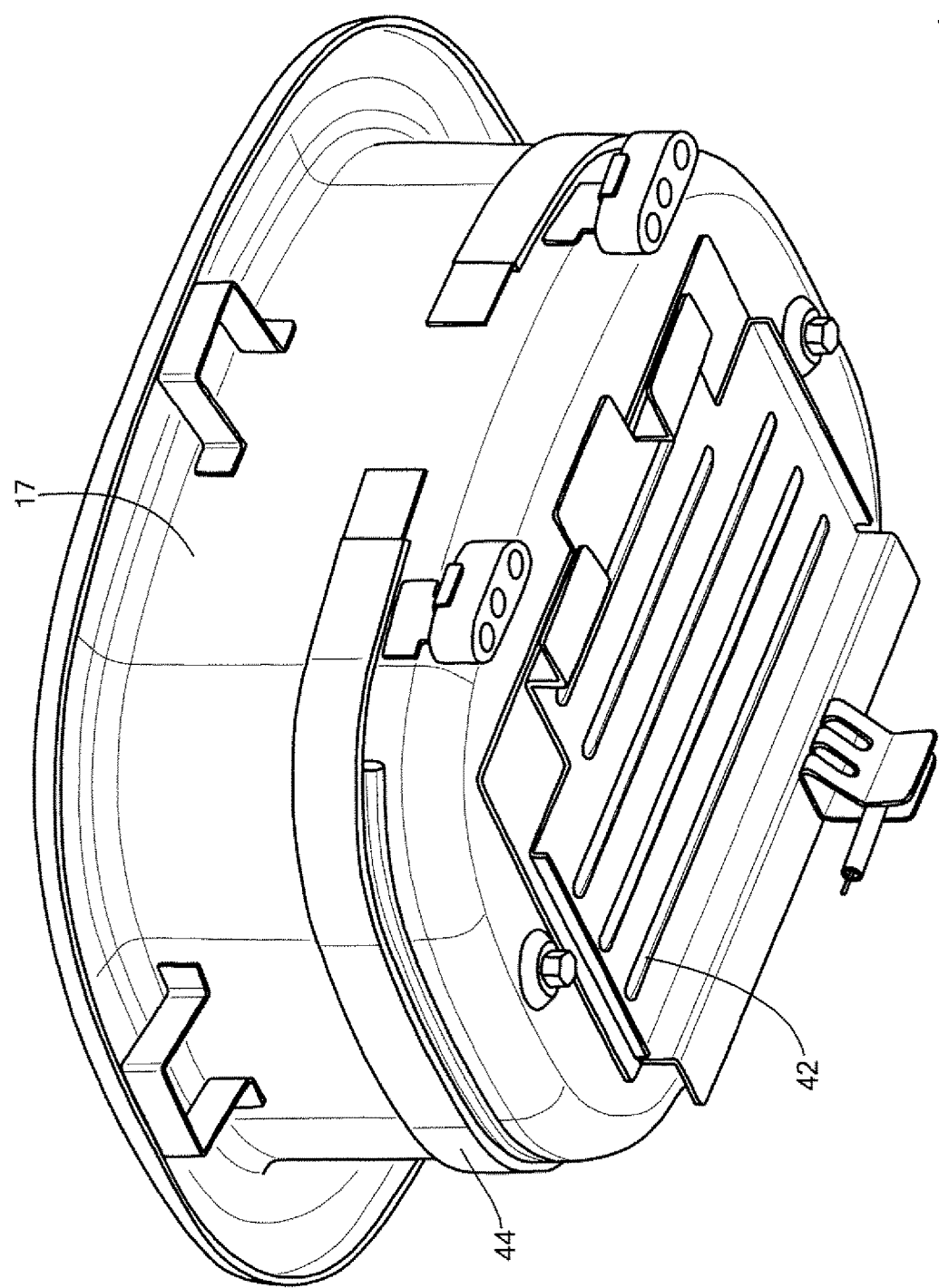
FIG. 4 is a perspective bottom view of a liner of the cooking system.

FIG. 4 is a perspective bottom view of a liner 17 of the cooking system 10. It will be appreciated by one skilled in the art that liner 17 and housing 12 can be used interchangeably and that although they're shown as separate components, the liner 17 and the housing 12 can be integrated as a single unit. In one embodiment, the heating element 42 can be disposed about the bottom of the liner 17 or housing 12. In another embodiment, the heating element 44 can be disposed substantially circumferentially about the sidewall of the liner 17 or housing 12. In yet another embodiment, the heating element 42, 44 can be disposed about the base of the housing and substantially circumferentially about the sidewall of the housing.

As discussed above, the heating element 42, 44 is capable of applying a predetermined power setting for cooking food products in the container 14. In one embodiment, the predetermined power setting includes a first power setting and a second power setting, where the first power setting is higher than the second power setting. For example, the first power setting can be at about 850 W and the second power setting can be at about 550 W. In another embodiment, the predetermined power setting includes a third power setting, where the second power setting is higher than the third power setting. For instance, the second power setting can be at about 550 W and the third power setting can be at about 250 W. It will be appreciated by one skilled in the art that the different power settings can be at any suitable power setting levels. Further, the power settings can be delivered via relays with mechanical switches where in an open position, no power is being delivered to the heating element 42, 44 and in a closed position, power is being delivered to the heating element 42, 44. It will also be appreciated by one skilled in the art that power can be delivered to the bottom heating element 42 or the side heating element 44 or both, or combinations thereof.

In one embodiment, the predetermined power setting includes a first cycle state and a second cycle state, where the first cycle state is higher than the second cycle state. For example, the first cycle state is at about 100% duty cycle and the second cycle state is at about 75% duty cycle (e.g., in a period power is on 75% of the time and off during the remaining 25%). In another embodiment, the predetermined power setting includes a third cycle state, where the second cycle state is higher than the third cycle state. For instance, the third cycle state is at about 25% duty cycle. In operation, there can be about 10 periods per hour (e.g., 6 minute periods). In other embodiments, the periods or cycles per hour can range anywhere from 5 periods per hour to 20 periods per hour. It will be appreciated by one skilled in the art that the cooking system 10 can entertain other suitable periods or cycles.

Figure 5:
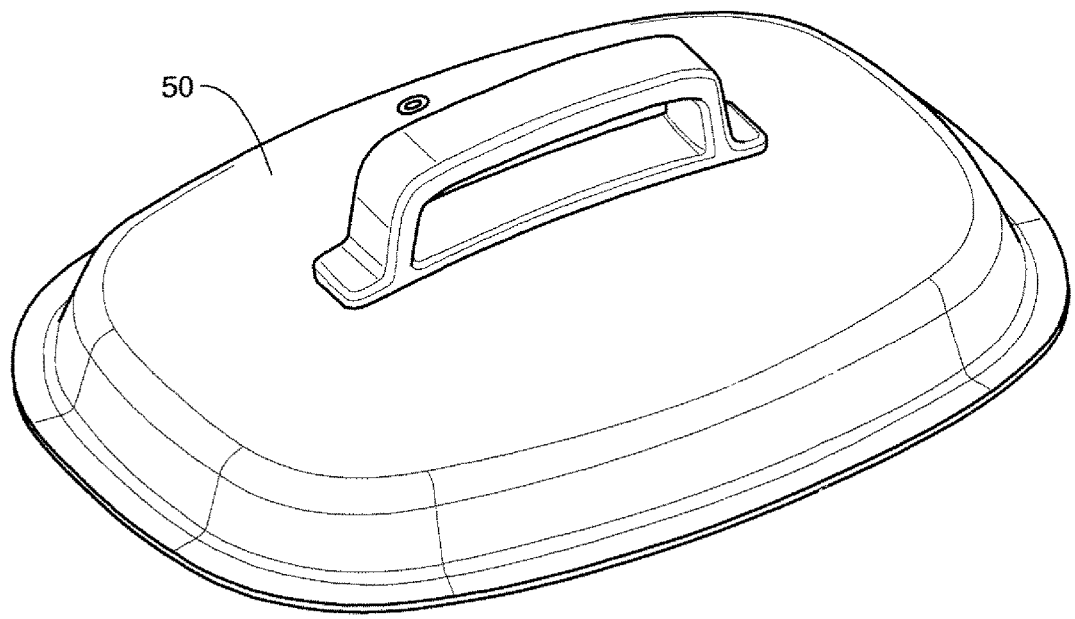
FIG. 5 is a perspective view of a lid of the cooking system.

FIG. 5 is a perspective view of a lid 50 of the cooking system 10. In one embodiment, the lid 50 can substantially cover the container 14. In another embodiment, the lid 50 can substantially cover the housing 12. In some instances, the lid 50 can substantially cover both the container 14 and the housing 12.

Figure 6:
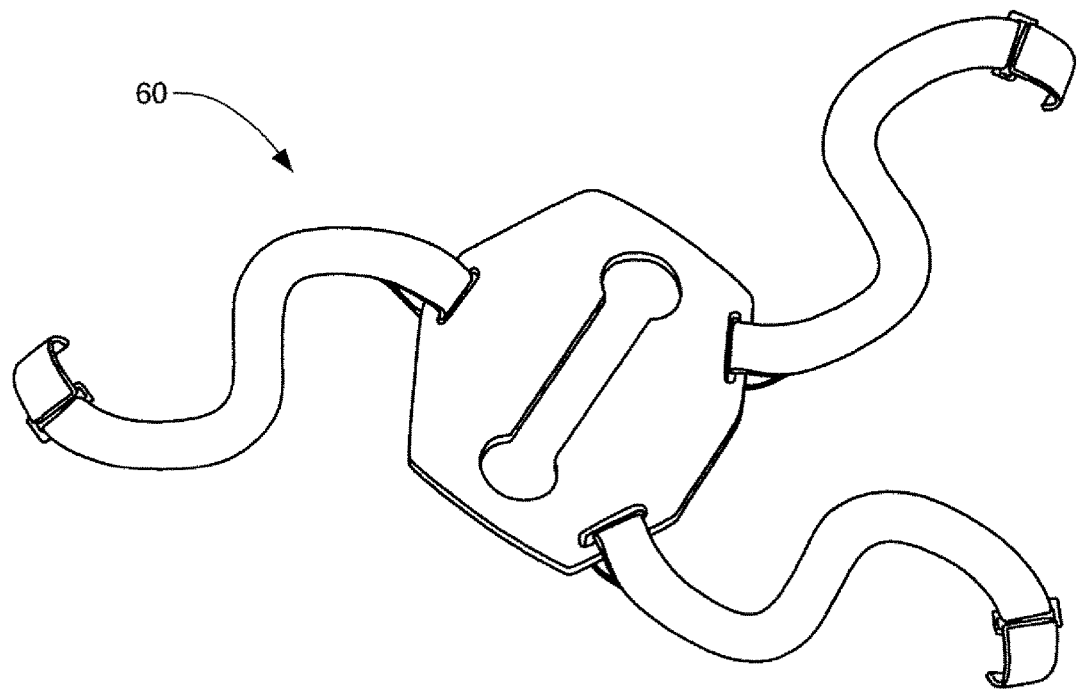
FIG. 6 is an illustration of a fastener for the cooking system according to one embodiment of the present disclosure.

FIG. 6 is an illustration of a fastener 60 for the cooking system 10 according to one embodiment of the present disclosure. The fastener 60 can be used to ensure that the food products within the container 14 are secured within in via the lid 50 coupled to the container 14 or housing 12 or both, especially during transport of the cooking system 10. As shown, the fastener 60 includes a central body having a cutout for securing the fastener 60 to the handle of the lid 50. Although the fastener 60 as shown includes three straps, it will be appreciated by one skilled in the art that the fastener 60 can have one strap, two straps, or four straps, or more than four straps. In one embodiment, the fastener 60 includes one or more straps that can be used for wrapping around the entire body of the housing 12 of the cooking system 10. The wrap around can be about the longitudinal axis, the lateral axis, the vertical axis, or combinations thereof.

Figure 7:
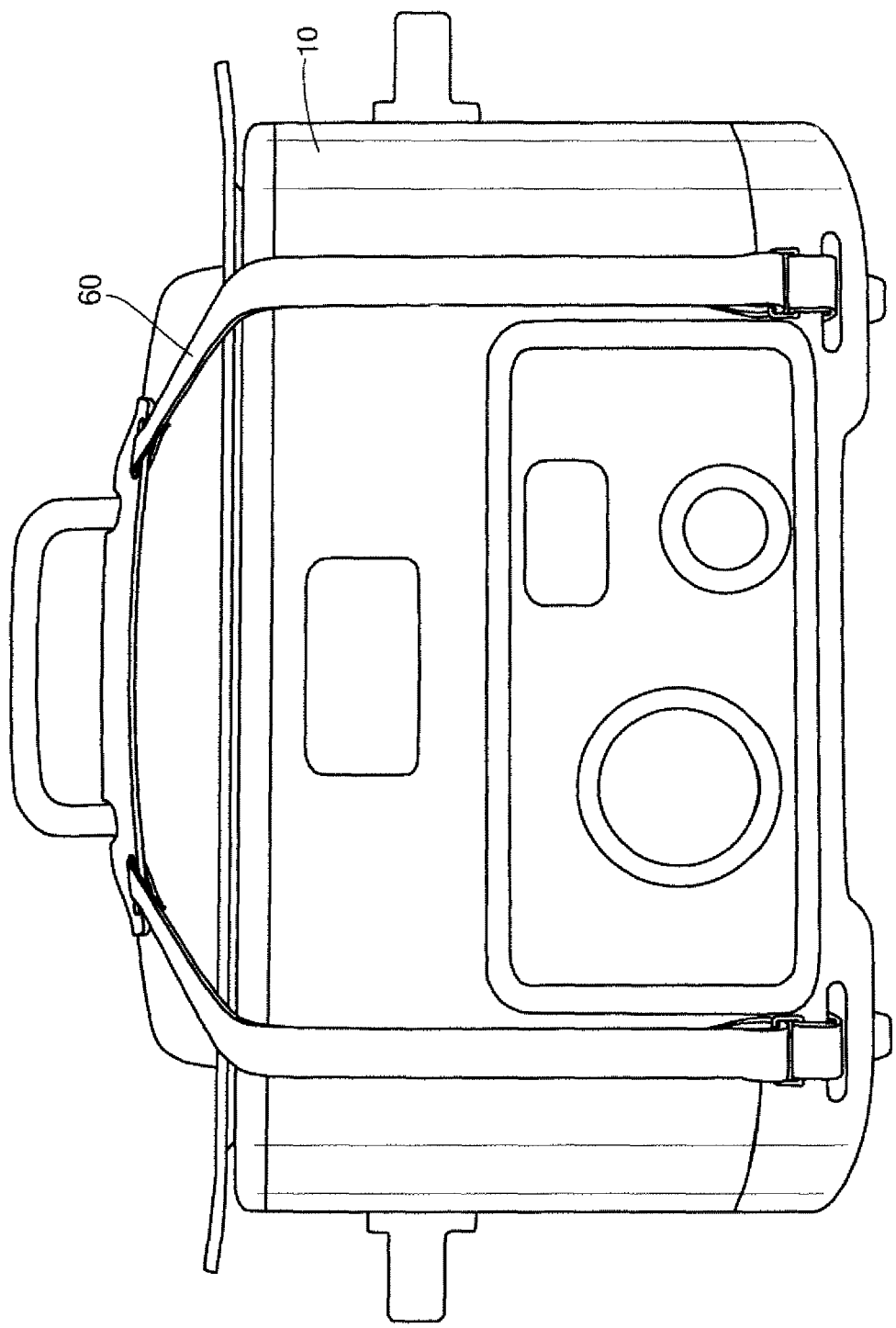
FIG. 7 is a front view of the fastener coupled to the cooking system.

FIG. 7 is a front view of the fastener 60 coupled to the cooking system 10. As shown, a plurality of holes can be formed in the base 18 of the cooking system 10 for securing the straps from the fastener 60. In this instance, the straps from the fastener 60 are secured about the lateral axis of the cooking system 10. Although holes are shown to receive the straps, as discussed above, one or more straps from the fastener 60 can wrap around the cooking system 10 without being received in holes or other apertures about the base 18. In other words, the strap or straps from the fastener 60 can be wrapped around the exterior surfaces of the cooking system 10 about the longitudinal axis, the lateral axis, the vertical axis, or combinations thereof.

In one embodiment, a cooking system 10 includes a housing 12 and a container 14 received within the housing 12, where the container 14 is capable of receiving water and food products. A heating element 42, 44 can be in communication with the container 14, where the heating element 42, 44 is capable of applying a power setting for cooking the food products in the container 14 without the container 14 having to achieve a predetermined temperature. In other words, there is no preheat step and the heating element 42, 44 is able to deliver power to cook the food products directly without having to achieve a preset or minimum temperature. In contrast, traditional cooking systems rely on temperature cycling where the cooking process will not begin unless or until a minimum threshold cooking temperature has been reached. In doing so, the traditional cooking system has the tendency to deliver more power with higher food loads leading to burning of the food products.

In another embodiment, the heating element 42, 44 is capable of converting water to steam to facilitate the cooking of the food products in the container 14. In contrast, because traditional cooking systems rely on reaching a minimum threshold cooking temperature before beginning the cooking process, there is a possibility that the water is never converted to steam because of the abundance of water. In the alternative, even if a traditional cooking system is able to convert water to steam, it will continue to do so as it tries to achieve a minimum threshold temperature thereby causing all the water to be converted into steam and not leaving any steam to facilitate in enhancing the cooking process resulting in food products that may be overcooked and/or dry out.

In some embodiments, because there are no temperature or time control during the cooking of the food products, the cooking system 10 may automatically shut off after a predetermined period of time (e.g., after 6 hours) as an added safety feature.

In some embodiments, the steam facilitates in reducing the amount of fat associated with the food products by at least about 5%, or at least about 10%, or at least about 15%, or at least about 20%, or at least about 25%, or at least about 30%, or at least about 35%, or at least about 40%, or at least about 45%, or at least about 50%. In other embodiments, the steam facilitates in reducing the cooking time of the food products by at least about 5%, or at least about 10%, or at least about 15%, or at least about 20%, or at least about 25%, or at least about 30%, or at least about 35%, or at least about 40%, or at least about 45%, or at least about 50%.

Like above, the container 14 can be a bowl or a pot. In one embodiment, the heating element 42 can be disposed about the base 18 of the housing 12. In another embodiment, the heating element 44 can be disposed substantially circumferentially about the sidewall of the housing 12. In yet another embodiment, the heating element 42, 44 can be disposed about the base of the housing and substantially circumferentially about the sidewall of the housing 14. In some embodiments, the cooking system 10 includes a lid 50 for covering the container 14. In other embodiments, the cooking system 10 includes a fastener 60 for securing the lid 50 and the container 14 to the housing 12. For example, the fastener 60 can be a strap.

In one embodiment, a method of cooking food products includes adding food products to a container received within a housing, concomitantly adding water to the container, and applying a cooking process to the food products within the container without waiting for the container to achieve a predetermined temperature, where water can be converted to steam by the cooking process facilitates in the cooking of the food products within the container.

In some embodiments, the steam facilitates in reducing the amount of fat associated with the food products by at least about 5%, or at least about 10%, or at least about 15%, or at least about 20%, or at least about 25%, or at least about 30%, or at least about 35%, or at least about 40%, or at least about 45%, or at least about 50%. In other embodiments, the steam facilitates in reducing the cooking time of the food products by at least about 5%, or at least about 10%, or at least about 15%, or at least about 20%, or at least about 25%, or at least about 30%, or at least about 35%, or at least about 40%, or at least about 45%, or at least about 50%.

Figure 8:
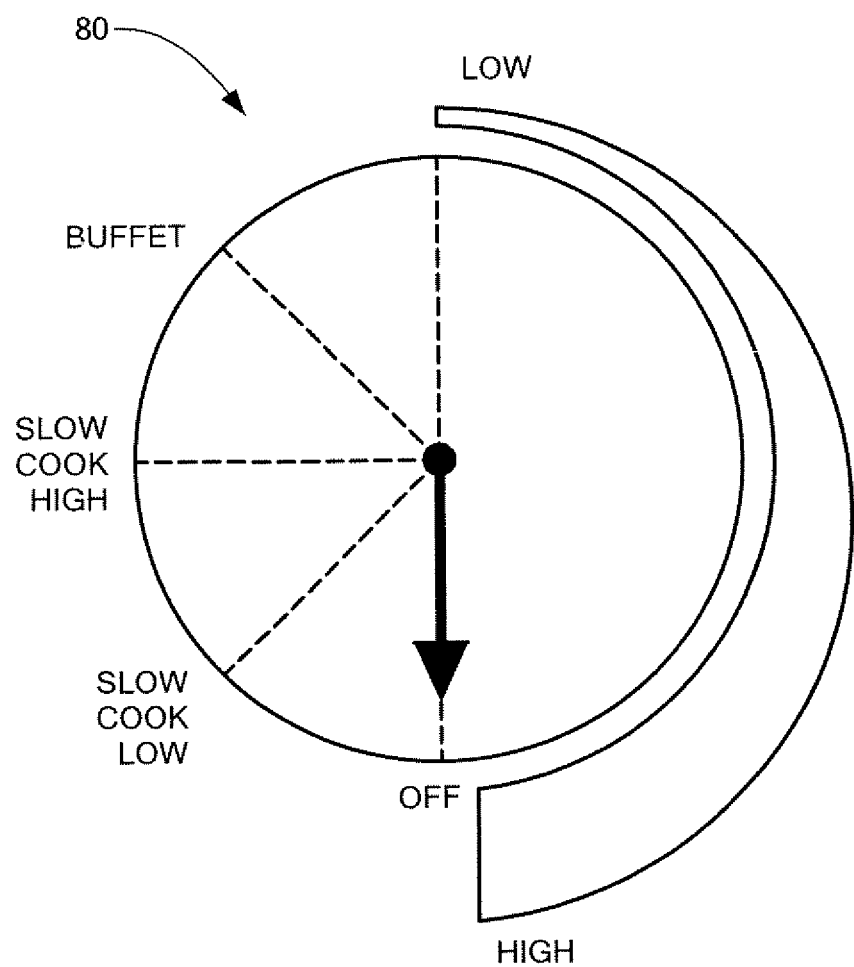
FIG. 8 is a diagram of a controller for the cooking system according to one embodiment of the present disclosure.

FIG. 8 is a diagram of a selector 80 for the cooking system 10 according to one embodiment of the present disclosure. In one embodiment, a cooking system 10 includes a housing 12, a container 14 received within the housing 12, where the container 14 is configured to receive food products, and a heating element 42, 44 in communication with the container 14, where the heating element 42, 44 is operable to apply at least one of predetermined power setting and continuous power setting for cooking the food products in the container 14 where the predetermined power setting and the continuous power setting are configured on a single selector 80.

In one embodiment, the predetermined power setting includes a first power setting and a second power setting, where the first power setting is higher than the second power setting. For example, the first setting may be a slow cook high and the second setting may be a slow cook low. In another embodiment, the predetermined power setting includes a third power setting, where the second power setting is higher than the third power setting. For example, the third setting may be buffet mode. In one embodiment, the predetermined power setting includes a first cycle state and a second cycle state, where the first cycle state is higher than the second cycle state. In another embodiment, the predetermined power setting includes a third cycle state, where the second cycle state is higher than the third cycle state.

In one embodiment, the continuous power setting includes incremental power being supplied to the container 14. As shown, another portion of the selector 80 includes a dial allowing a user to adjust power between high to low. In another embodiment, the continuous power setting includes gradient heat being provided from the heating element 42, 44 to the container 14.

In some instances, the cooking system disclosed herein is capable of providing countertop cooking and slow cooking in a single appliance. The sear/sauté feature allows maximized flavors and blended textures, and can be finished off by infusing flavors with the slow cooking function, all within one pot rendering the cooking system perfect for home cooking or travel on the go.

In one example, the cooking system is capable of sautéing and slow cooking of holiday stuffing and side vegetable dishes. Fish entrees can be slow cooked in less than 20 minutes. Flavors can be infused into stews where vegetables and meat can be seared to perfection. Ethnic meals can be sautéed for flavor and texture, and then slow cooked to melt and meld flavors. Homemade soups and chili can be made by sautéing meats and vegetables first to create more depth of flavor. Other food products that can be made include without limitation desserts including the likes of cheesecakes, baked pears, bread puddings, rice puddings, and more.

The cooking system is capable of roast, steam roast and steam bake with faster, healthier and more delicious results. Plus the cooking system is capable of sear and slow cook. The roast function allows easy preparation of dinners from the freezer to the table. The dual heating system is able to cook frozen meatballs, dry pasta and sauce in 30 minutes or less. The side and bottom heating elements are capable of cooking lasagna to produce crusty texture. In addition, the dual heating elements are able to quickly deglaze meat dishes. In some instances, the dual heating system provides a more even heating leading to no rubbery edges on the food products.

The steam roast function includes steam-infused cooking of chicken with rosemary, broth and lemon peel; roast beef with beef broth, onions, carrots and fennel; and salmon with tarragon, lemon, wine and steamed vegetables, among others. In one embodiment, steam roasting allows cooking times to be reduced by up to 40% versus traditional conventional ovens. In another embodiment, steam roasting can reduce fat by up to 20% where natural juices stay within the food and the bad fats are released.

The steam bake function includes baking of cupcakes to be moister and bake faster, make steam-baked chocolate chip loaves with less fat, and baking of custards and flans, among others. In one embodiment, steam baking allows the addition of only half the fat while retaining the moistness of the food.

Figure 9:
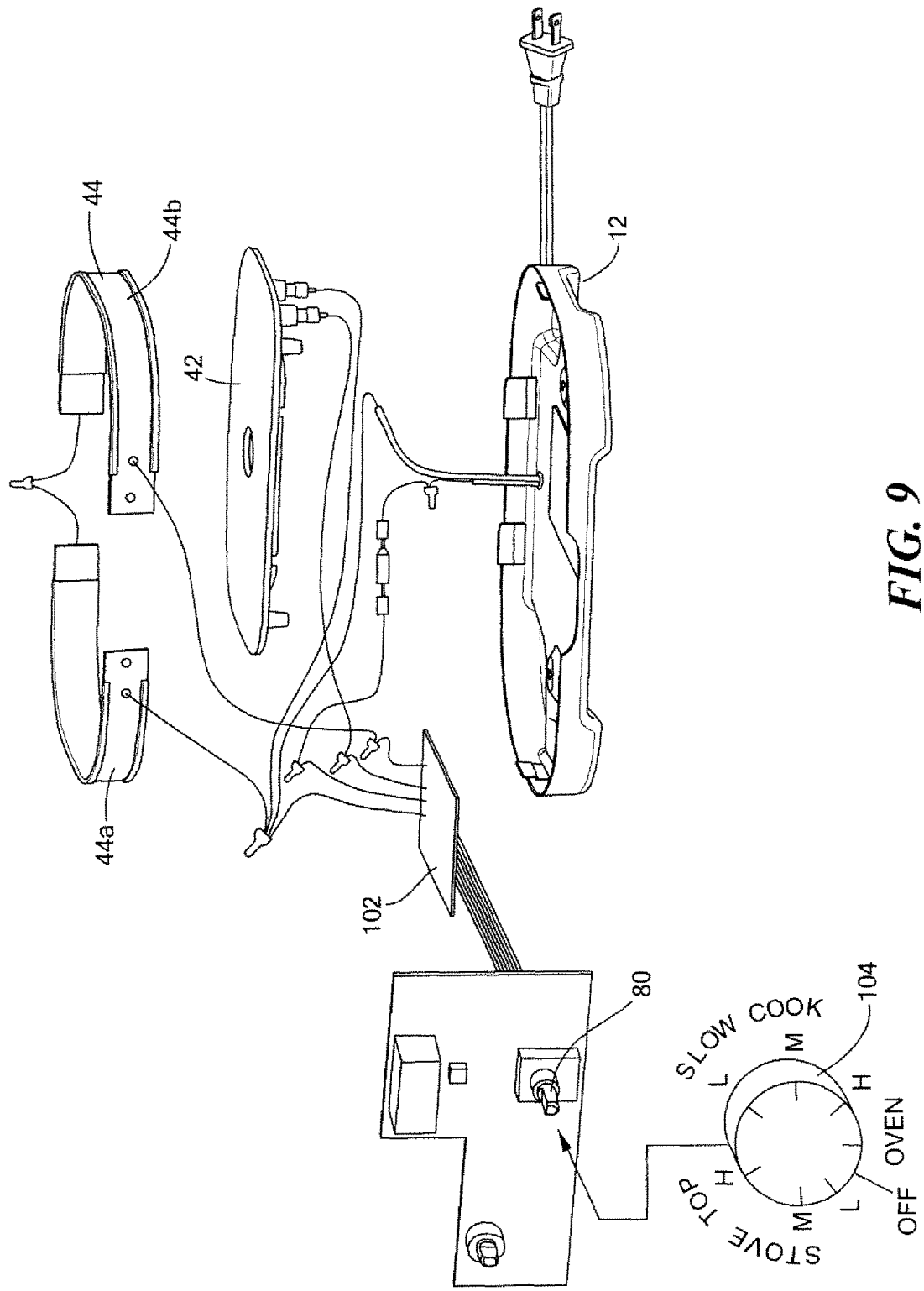
FIG. 9 is an exploded view showing a portion of the cooking system in an example of the invention.

FIG. 9 shows an example with housing portion 12, bottom heating element 42 and side circumferential heating element 44 including two segments 44a and 44b electrically connected in series and via wirers connected to selector 80 fitted with knob 104. Printed circuit board 102 includes controller 110, FIG. 10 (e.g., a microcontroller, field programmable gate array (FPGA), application specific integrated circuit (ASIC), microprocessor, or the like). Controller 110 may include one or multiple devices or chips each programmed in accordance with the following description. Controller 110 controls side heater switch 112 and bottom heater switch 114. Switches 112 and 114 may be relays or transistors.

When selector knob 104, FIG. 9 is turned to the slow cook mode, only the side element is energized. When the selector knob is turned to the stove top mode, both the side and the bottom heater elements are energized to quickly produce sufficient heat for searing, frying, and the like. Preferably, controller 110, FIG. 10 controls switches 112 and 114 and thus side element 44 and bottom element 42 according to a plurality of duty cycles.

FIG. 11 depicts a few exemplary duty cycles. In the stove top high mode, switches 112 and 114, FIG. 10 are cycled on and off at a duty cycle of between 50-90%. Thus, both the bottom element and the side element are cycled on and off according to this duty cycle for quick searing and frying operations. When the stove top low mode is selected, switches 112 and 114, FIG. 10 are cycled on and off at a duty cycle of between 10-40%. Thus, both the bottom heater and the side heater are cycled on and off according to a slower duty cycle.

In the slow cook high mode, the side heater is cycle on and off at a duty cycle of between 50-90% and, in the slow cook low mode, the side heater is cycled on and off according to a duty cycle of between 10-40%. In all slow cook modes, the bottom heater is preferably kept switched off. There may be settings and selections between high and low in all modes such as a medium stove top mode and a medium slow cook mode. And, there may be finer adjustments that may be made in accordance with examples of the invention. In some examples, the duty cycle can increase based on each turn of the knob in 10% increments (a 10% duty cycle, a 20% duty cycle, a 30% duty cycle, and so on).

The result is an ergonomic user interface which is less confusing to the user. Switching between the heating elements and/or running them simultaneously is now automatic. Furthermore, during the stovetop mode, sufficient heat is provided quickly for searing meat and/or other food products.

Controller 110, FIG. 10 may be programmed to time the length of time bottom heater 42 is on and to limit the time it is on (to, for example, 3 minutes or less) to prevent damage to the bottom heating element.

Controller 110 can also control both heaters in an oven mode (see FIG. 9) where temperature is selected via the right knob in FIG. 1. Both heating elements are controlled by a thermal sensor such as a NTC sensor without the use of a duty cycle Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A cooking system comprising:
   a housing;
   a liner in the housing including:
      a bottom heating element, and
      a side circumferential heating element in a plurality of segments electrically connected; and
   a control subsystem including:
      a knob movable between a plurality of positions to select operation of the cooking system in a plurality of cooking modes, the plurality of cooking modes including an oven mode, a stove top mode, and a slow cook mode, the knob further being movable to a temperature associated with the stove top mode and the slow cook mode, the temperature being selected from a high temperature mode and a low temperature mode associated with the stove top mode and the slow cook mode; and a selector operable to apply a predetermined power setting or a continuous power setting to at least one of the bottom heating element and the side circumferential heating element in response to the position of the knob, wherein during operation in the high temperature mode and the low temperature mode, at least one of the bottom heating element and the side circumferential heating element is cycled on and off via a duty cycle, wherein in the stove top mode, both the bottom heating element and the side circumferential heating element are energized by applying a predetermined power setting;

wherein in the slow cook mode, the side circumferential heating element is energized by applying a predetermined power setting and the bottom heating element is de-energized; and wherein in the oven mode both the bottom heating element and the side circumferential heating element are energized by applying a continuous power setting in response to a selected temperature.

2. The system of claim 1 in which the control subsystem further includes:
a first switch for energizing the bottom heating element,
a second switch for energizing the side heating element, and
a controller configured to control the first and second switches.

3. The system of claim 2 in which the controller is operable, in response to selection of the stove top mode and the high temperature mode, to switch the first switch on and off according to a first duty cycle and to switch the second switch on and off according to a second duty cycle.

4. The system of claim 3 in which the first duty cycle and the second duty cycle are equal or approximately equal.

5. The system of claim 2 in which the controller is operable, in response to selection of the stove top mode and the low temperature mode, to switch the first switch on and off according to a third duty cycle.

6. The system of claim 5 in which the controller is operable, in response to selection of the stove top mode and the low temperature mode, to switch the second switch on and off according to a fourth duty cycle.

7. The system of claim 6 in which the third duty cycle and the fourth duty cycles are equal and approximately equal.

8. The system of claim 3 in which the controller is configured, in response to selection of the slow cook mode and the low temperature mode, to switch the second switch on and off according to the first duty cycle.

9. The system of claim 8 in which the controller is configured, in response to selection of the slow cook mode and the low temperature mode, to switch the second switch on and off according to the fourth duty cycle.

10. The system of claim 3 in which the controller is configured to switch at least one of the first switch and the second switch according to a plurality of additional cycles in the stove top and/or slow cook modes.

11. A cooking system comprising:
a housing;
a liner in the housing including:
a bottom heating element, and
a side circumferential heating element in a plurality of segments electrically connected; and
a first switch for energizing the bottom heating element;
a second switch for energizing the side circumferential heating element;
a knob movable between a plurality of positions to select operation of the cooking system in a plurality of cooking modes, the plurality of cooking modes including an oven mode, a stove top mode, and a slow cook mode, the knob further being movable to a temperature associated with the stove top mode and the slow cook mode, the temperature being selected from a high temperature mode and a low temperature mode associated with the stove top mode and the slow cook mode; and
a controller operable to control the first and second switches to apply a predetermined power setting or a continuous power setting to at least one of the bottom heating element and the side circumferential heating element in response to the knob, wherein during operation in the high temperature mode and the low temperature mode, at least one of the bottom heating element and the side circumferential heating element is cycled on and off via a duty cycle, and during operation in the oven mode, both the bottom heating element and the side circumferential heating element are energized by applying a continuous power setting in response to a selected temperature.

12. The system of claim 11 in which the controller is configured to energize the side circumferential heating element and the bottom heating element in the stove top mode.

13. The system of claim 12 in which the controller is configured, in response to selection of the stove top mode and the high temperature mode, to switch the first switch on and off according to a first duty cycle and to switch the second switch on and off according to a second duty cycle.

14. The system of claim 13 in which the first and second duty cycles are equal or approximately equal.

15. The system of claim 12 in which the controller is configured, in response to selection of the stove top mode and the low temperature mode, to switch the first switch on and off according to a third duty cycle.

16. The system of claim 15 in which the controller is configured, in response to selection of the stove top mode and the low temperature mode, to switch the second switch on and off according to a fourth duty cycle.

17. The system of claim 16 in which the third and fourth duty cycles are equal or approximately equal.

18. The system of claim 12 in which the controller is configured, in response to selection of the slow cook mode and the high temperature mode, to switch the second switch on and off according to the first duty cycle.

19. The system of claim 18 in which the controller is configured, in response to selection of the slow cook mode and the low temperature mode, to switch the second switch on and off according the fourth duty cycle.

20. A cooking system control method comprising:
moving a knob of the cooking system to select an oven mode;
energizing both a bottom heating element and a side heating element of the cooking system by applying a continuous power setting in response to a selected temperature in the oven mode in response to a selected temperature;
moving the knob of the cooking system to select a stove top mode;

energizing both the bottom heating element and the side heating element of the cooking system in the stove top mode;

moving the knob of the cooking system to select a stove top mode;

energizing only the side heating element of the cooking system in the slow cook mode;

wherein in at least one of the stove top mode and the slow cook mode, the cooking system is operable in one of a high temperature selection and a low temperature selection via movement of the knob, operation in the high temperature selection includes switching at least one of the bottom and side heating elements on and off according to one or more higher duty cycles and operation in the low temperature selection includes switching at least one the bottom and side heating elements on and off according to one more lower duty cycles.

21. The method of claim 20 in which, in a high temperature slow cook selection, the side heating element is switched on and off according to a higher duty cycle and, in a low temperature slow cook selection, the side heating element is switched on and off according to a lower duty cycle.

\* \* \* \* \*